(12) United States Patent
Okamura et al.

(10) Patent No.: US 6,310,762 B1
(45) Date of Patent: Oct. 30, 2001

(54) CARBON MATERIAL FOR ELECTRIC DOUBLE LAYER CAPACITOR, METHOD OF PRODUCING SAME, ELECTRIC DOUBLE LAYER CAPACITOR AND METHOD OF FABRICATING SAME

(75) Inventors: Michio Okamura, Yokohama; Makoto Takeuchi, Tokyo, both of (JP)

(73) Assignee: Jeol Ltd., Tokyo (JP)

(*) Notice: Subject to any disclaimer, the term of this patent is extended or adjusted under 35 U.S.C. 154(b) by 0 days.

(21) Appl. No.: 09/261,625

(22) Filed: Mar. 3, 1999

(30) Foreign Application Priority Data

Mar. 3, 1998 (JP) .................................. 10-050862

(51) Int. Cl.[7] .......................... H01G 9/155; H01G 9/00; H01G 2/10; H01G 9/08; C01B 31/00
(52) U.S. Cl. .......................... 361/502; 361/503; 361/517; 423/445 R
(58) Field of Search ..................... 361/272, 273, 361/274.1–274.3, 275.1–275.4, 502, 503, 517, 518, 520, 521, 522; 423/445 R; 429/209, 210, 213

(56) References Cited

FOREIGN PATENT DOCUMENTS 6378513    4/1988   (JP) .

*Primary Examiner*—Dean A. Reichard
*Assistant Examiner*—Eric Thomas
(74) *Attorney, Agent, or Firm*—Webb Ziesenheim Logsdon Orkin & Hanson, P.C.

(57) ABSTRACT

There is disclosed a carbon material from which an electric double layer capacitor (EDLC) having a large capacitance can be fabricated. First, a carbon material is activated to produce crystallites of graphite-like carbon having interlayer distances of 0.365 to 0.385 nm. Positive and negative plates are fabricated using the crystallites.

10 Claims, 3 Drawing Sheets

CARBON MATERIAL FOR ELECTRIC DOUBLE LAYER CAPACITOR, METHOD OF PRODUCING SAME, ELECTRIC DOUBLE LAYER CAPACITOR AND METHOD OF FABRICATING SAME

FIELD OF THE INVENTION

The present invention relates to an electric double layer capacitor (EDLC) and, more particularly, to a carbon material for EDLCs, a method of producing a carbon material for EDLCs, an electric double layer capacitor (EDLC) and a method of fabricating such an EDLC.

DESCRIPTION OF THE PRIOR ART

An EDLC, also known as a supercapacitor or electrochemical capacitor, has a pair of polarized plates made of activated carbon. These plates are placed opposite to each other via a separator and are used as a positive electrode and a negative electrode, respectively. Each plate is impregnated with an aqueous electrolyte solution or a nonaqueous electrolyte solution and contacted with a collector. Each polarized plate is manufactured, for example, by (1) adding small amounts of a conductive additive and binder to activated carbon, kneading them together and rolling the mixture into a desired form, (2) adding small amounts of a conductive additive and binder to activated carbon, dissolving the mixture to form a slurry and applying it to a collector, or (3) mixing a small amount of uncarbonized resin into activated carbon and sintering the mixture.

In the past, it has been considered that the capacitance of an EDLC is roughly in proportion to the surface area of the polarized plates. For this reason, activated carbon with large specific surface area has been used as a carbon material for EDLCs.

Activated carbon is prepared by carbonizing a carbonaceous material at a temperature lower than 800° C. and then activating the material. The activation is performed either by heating at 600–1000° C. in an ambient of steam or carbon dioxide or by adding zinc chloride, potassium hydroxide, or the like and carrying out a heating step in an inert ambient. During this activation process, a large number of micropores adapted for adsorption are formed in the surface of the carbon material produced by the carbonization process.

In the part, in order to make the capacitance of the EDLC as large as possible, attempts have been made to increase the surface area of activated carbon. For example, Japanese Patent Laid-Open No. 78513/1988 proposes a technique for obtaining activated carbon by mixing potassium hydroxide into petroleum cokes and calcinating the mixture. It is said that the specific surface area which was about 1500 $m^2/g$ at maximum in the past could be increased to 2000–3500 $m^2/g$. However, we have found that even if activated carbon whose specific surface area is increased is used as a polarized electrode material, limitations are imposed on the obtainable capacitance since the surface area per unit volume decreases by strong activation.

SUMMARY OF THE INVENTION

The present invention is intended to provide an EDLC having a large capacitance.

It is a specific object of the invention to provide a carbon material from which an EDLC having a larger capacitance than heretofore can be fabricated.

It is another object of the invention to provide a method of producing this carbon material.

It is a further object of the invention to provide an EDLC using this carbon material.

It is yet another object of the invention to provide a method of fabricating this EDLC.

A carbon material produced in accordance with the present invention and used for an EDLC has crystallites of graphite-like carbon produced by activating a carbon material. The carbon material is characterized in that the crystallites have interlayer distances of 0.365 to 0.385 nm.

A method of fabricating a carbon material for an EDLC in accordance with the present invention starts with heating a raw material to carbonize it, thus growing crystallites of graphite-like carbon. The heat-treated carbon material is activated with an alkali. The obtained carbon material consists of crystallites of carbon having interlayer distances of 0.365 to 0.385 nm.

In a method of producing a carbon material for an EDLC in accordance with the present invention, the carbon material is activated with steam. A carbon material consisting of crystallites of graphite-like carbon is obtained. These crystallites have interlayer distances of 0.365 to 0.385 nm.

An EDLC in accordance with the present invention has polarized plates immersed in an organic electrolyte.

These polarized plates are made of a carbon material including crystallites of graphite-like carbon produced by activating a carbon material. The crystallites have interlayer distances of 0.365 to 0.385 nm.

A method of fabricating an EDLC having polarized plates immersed in an organic electrolyte in accordance with the present invention uses a carbon material having crystallites of graphite-like carbon produced by activating a carbon material. The crystallites have interlayer distances of 0.365 to 0.385 nm. After the EDLC has been assembled, a voltage in excess of the rated voltage is applied across the polarized plates to induce a capacitance.

The EDLC in accordance with the present invention has the polarized plates consisting of a carbonaceous material that expands on application of the voltage. The polarized plates are held within a dimension-limiting structure that limits the expansion on application of the voltage.

Other objects and features of the invention will appear in the course of the description thereof which follows.

DESCRIPTION OF THE PREFERRED EMBODIMENTS

Figure 1:
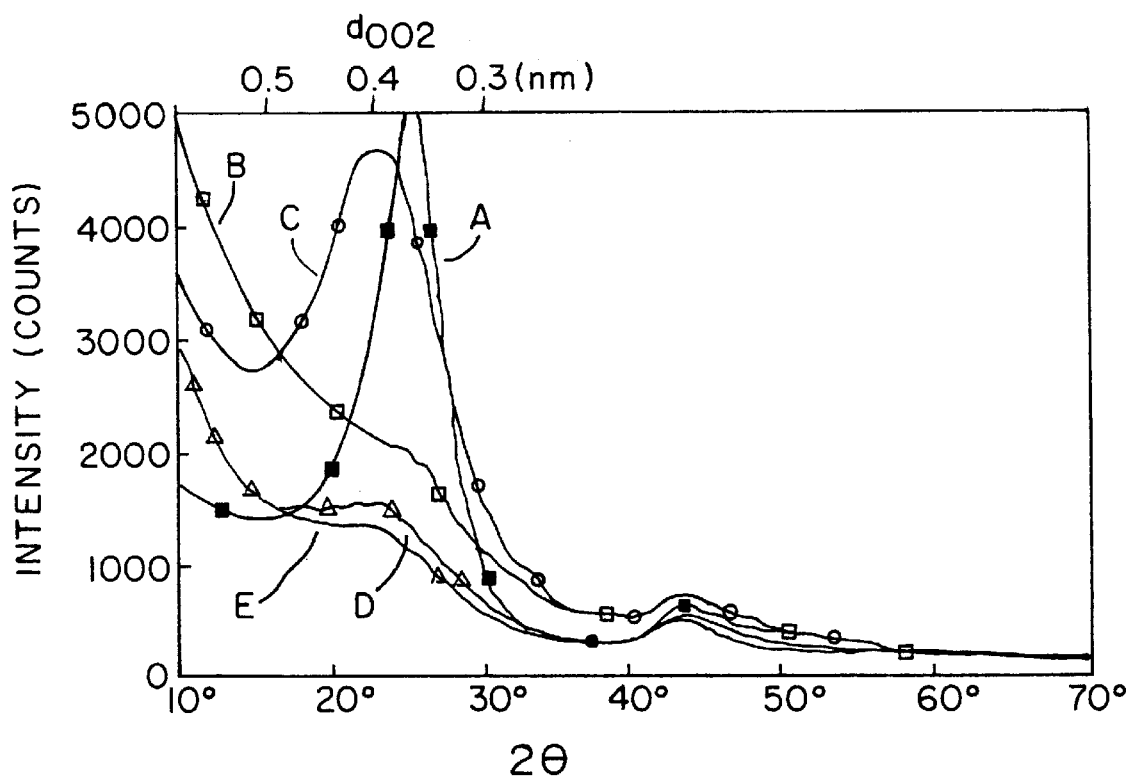
FIG. 1 is a diagram illustrating the results of X-ray diffraction measurements of carbonaceous materials including a material in accordance with the present invention.

The present invention provides a carbon material for an EDLC that exhibits a large capacitance when the carbon material is used as the polarized plates forming the capacitor.

This carbon material for the EDLC is produced, based on the finding that the carbon material activated shallowly exhibits a large capacitance where polarized plates are fabricated from the carbon material having crystallites of graphite-like carbon. Since this carbon material has a low specific surface area, it is not suitable as a material of the EDLC where conventional standards are applied. However, where the interlayer distances of the carbon material are in a given range of 0.365 nm to 0.385 nm, polarized plates made of the carbon material show a large capacitance in spite of the small specific surface area.

Carbon materials obtained up to date in accordance with the present invention exhibit large capacitances where used as the material of polarized plates of EDLCs and expand on application of a voltage.

In particular, the carbon material obtained up to now in accordance with the present invention is shaped into sheets and collectors are stacked on the outer faces of the sheets. An EDLC is assembled using these collectors. A voltage is applied across the collectors. The carbon material expands principally in the direction of application of the voltage across the collectors.

When the carbon material forming the positive and negative plates expands, the EDLC increases in volume. This will cancel out the increase in the capacitance of the EDLC per unit volume if the capacitance of the EDLC increases in this way. It is possible to make effective use of the increase in the capacitance by minimizing the increase in the volume of the EDLC due to expansion of the carbon material.

Our discussions have revealed that if the increase in the volume of the carbon material in accordance with the present invention is suppressed completely (i.e., the distance between the collectors in contact with the carbon material is not allowed to increase and thus the volume of the EDLC does not increase), the capacitance increases by the same amount as in the case when free expansion is permitted.

If the distance between both collectors is fixed during expansion due to application of a voltage, pressure will be generated between the collectors. This pressure will hereinafter be referred to as the "expansion pressure".

Our discussions have shown that carbon materials built in accordance with the present invention and adapted to be used in EDLCs have the following tendency. Those carbon materials which expand more on application of a voltage produce EDLCs having greater capacitances. Preferably, the materials produce expansion pressures greater than 2 $kg/cm^2$.

Carbon materials, according to the present invention, and conventional activated carbon for EDLCs were investigated by X-ray diffraction. The results are shown and compared in FIG. 1.

Generally, fine structures of carbon materials are analyzed, based on graphite having a clear structure. Graphite powder was measured by X-ray diffraction. Diffraction peaks of $C_{002}$ were observed. One of the peaks is sharp at interlayer distance $d_{002}$=0.335 nm. That is, a benzene ring-like, two-dimensional network structure is grown in layers sufficiently.

The conventional EDLC is intended to give rise to a large capacitance density and uses strongly activated carbon. Generally, $C_{002}$ has fewer peaks. Furthermore, the peak at $d_{002}$ spreads more than 0.40 nm. Therefore, these peaks usually are not observed clearly.

In the carbonaceous material used in the present invention, the interlayer distance $d_{002}$ is 0.365 to 0.385 nm, which is considerably greater than that of graphite. However, the diffraction peak of $C_{002}$ at the interlayer distance $d_{002}$ has a high integrated intensity. Hence, it can be seen that this carbon material has crystallites of graphite-like carbon. In FIG. 1, X-ray diffraction curve A is obtained from a material that is under carbonization. X-ray diffraction curve B is derived from activated carbon for the prior art EDLC, the activated carbon having been deeply activated until a specific surface area of 2000 $cm^2/g$ was obtained. X-ray diffraction curve C is obtained from a carbon material in accordance with the present invention the carbon material being activated shallowly.

Carbon materials for EDLCs in accordance with the present invention are carbon materials calcinated at low temperatures. That is, the activation has not progressed too much. The materials can be produced from various raw materials including woods, nutshells, coals, pitch and petroleum cokes. For example, the activation can be suppressed by heat-treating the material in an inert ambient before the activation. Alternatively, the activation may be performed in a short time. Preferably, the material is calcinated at a relatively low heat-treatment temperature, e.g., about 600° C.–1000° C.

When the carbon material in accordance with the present invention is expanded on application of a voltage, the impregnant, or the electrolyte, was sufficiently boiled and washed away with a volatile solvent, such as acetonitrile. Then the material was dried and measured by X-ray diffraction. The diffraction peak intensity of $C_{002}$ and the interlayer distance $d_{002}$ were the same as the values of the carbon material not yet applied with the voltage.

The expansion pressure in the EDLC using polarized plates of the carbon material in accordance with the present invention can be measured by placing a pressure sensor such as a strain gauge on the outside of the electrode pair and mechanically holding the pressure sensor from behind, i.e., the thickness or the expansion is limited.

Figure 2:
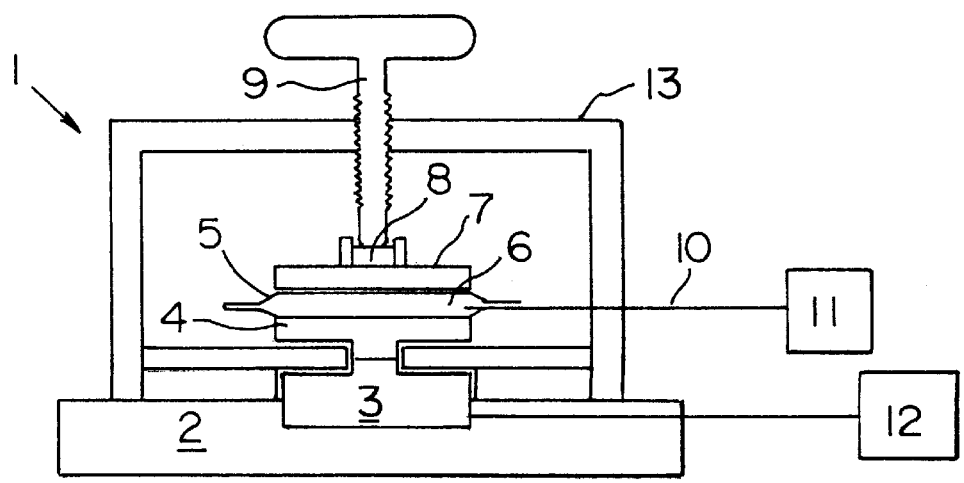
FIG. 2 is a side elevation view of a capacitance/expansion pressure-measuring instrument.

FIG. 2 is a cross-sectional view of an instrument for measuring capacitance and expansion pressure. This instrument, generally indicated by reference numeral 1, has a base plate 2 on which a pressure sensor 3, such as a strain gauge, is mounted. A lower metal block 4 and an upper metal block 7 are stacked on the pressure sensor 3. An EDLC 6 coated hermetically with synthetic resin film 5 is sandwiched between the two blocks. In this capacitor 6, a first collector of aluminum, a first carbon electrode, a separator, a second carbon electrode and a second collector of aluminum are stacked on top of each other in this order. The lamination is impregnated with an electrolyte. A thrust bearing 8 is placed on the upper metal block 7. A screw 9 whose front end bears against the thrust bearing 8 is mounted to a rugged frame 13.

A voltage is applied across the collectors of the EDLC 6 from a power supply 11 via leads 10. The output from the pressure sensor is supplied to a recorder 12 where the output is recorded.

Figure 3:
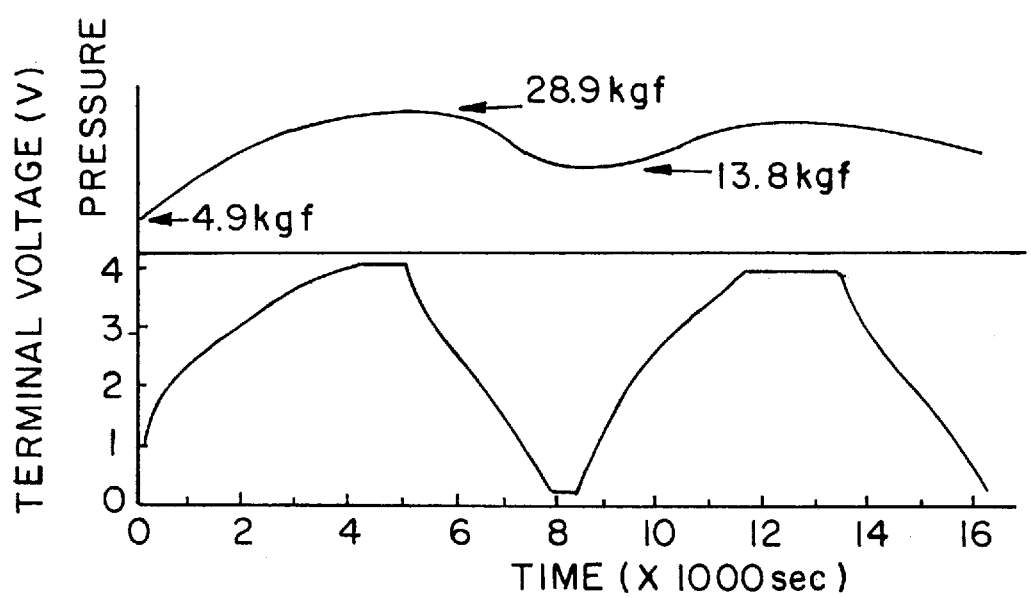
FIG. 3 is a diagram illustrating charge/discharge characteristics of EDLCs using polarized plates made of the carbon material in accordance with the present invention, as well as variations in the expansion pressure measured simultaneously.

FIG. 3 is a diagram illustrating the charge/discharge characteristics of EDLCs using polarized plates made of the carbon material in accordance with the present invention as well as expansion pressures. The measurements were made by the instrument shown in FIG. 2.

An EDLC having polarized plates each having a diameter of 20 mm and a thickness of 0.5 mm was assembled. The plates were made of the carbon material in accordance with the present invention. Immediately after the assembly operation, the capacitor was repeatedly charged and discharged with a constant current of 10 mA. The first and second cycles of this process are shown in FIG. 3. The expansion pressure increased from an initial set pressure and assumed a maximum value at the beginning of discharge. Then the pressure continued to drop until the discharge ended. However, the pressure did not return to the initial value.

Figure 4:
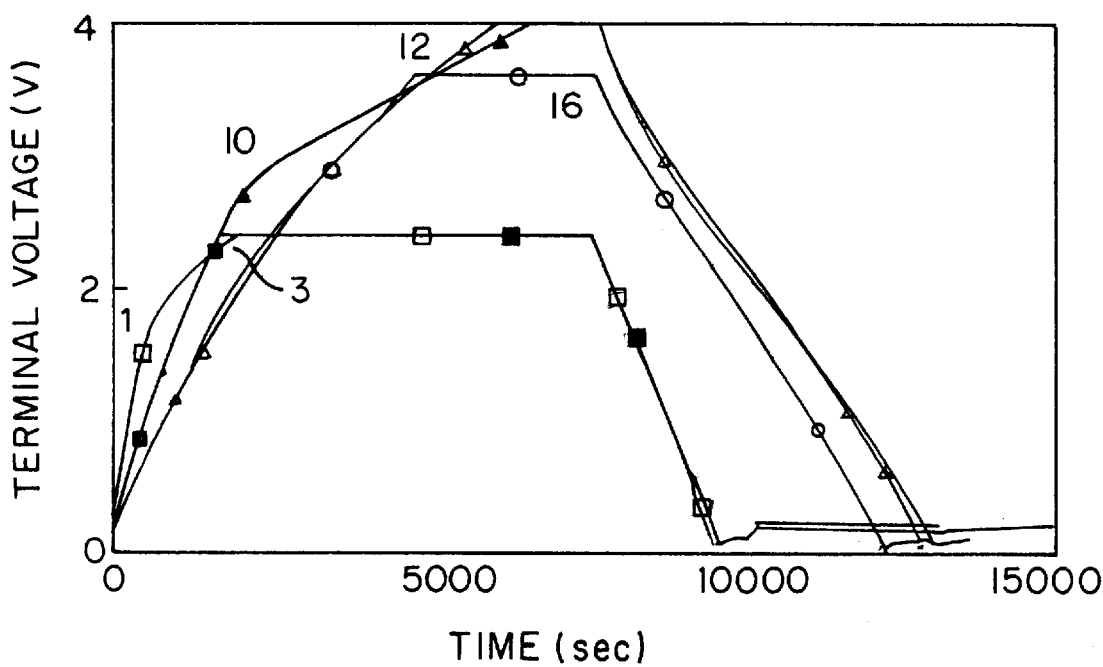
FIG. 4 is a diagram illustrating variations in the charge/discharge characteristics of EDLCs in accordance with the present invention when the EDLCs are charged and discharged with various voltages.

EDLCs in accordance with the present invention were charged and fully discharged repeatedly 16 times. Variations in the terminal voltage of each capacitor are shown in FIG. 4. The capacitor has a rated voltage of 2.3 V. The charging voltage was equal to the rated voltage of 2.3 V from cycle 1 to cycle 9 of the charge/discharge process. The charging voltage was 4 V, which was higher than the rated value, from cycle 10 to cycle 15 of the charging process. During cycle 16 of the charging process, the voltage was 3.5 V. Note that FIG. 4. shows the results of only cycles 1, 3, 10, 12 and 16. Time is plotted on the horizontal axis. The terminal voltage is plotted on the vertical axis. Since the charging and discharging process was conducted with a Constant current, the gradient of the charge/discharge curve is in inverse proportion to the capacitance.

As can be seen from the graph of FIG. 4, during cycle 1 of the charging and discharging process, the capacitor is charged first after the manufacture. After the start of the charging, the terminal voltage rose rapidly linearly due to extremely small capacitance. The increasing rate of the terminal voltage slowed down rapidly near 1.5 V. Then the capacitance increased.

The capacitance increased during the latter part of the charging period of cycle 1 of the charge/discharge process and was maintained after discharging. That is, during cycle 3 of the charge/discharge process, the increasing rate of the terminal voltage during charging was about half of the rate during cycle 1. This means that the capacitance during cycle 3 is about twice the capacitance at the beginning of charging during cycle 1.

After cycle 10 of the charge/discharge process, the charging voltage was raised to 4 V. During cycle 10 of the charge/discharge process, the terminal voltage increased at the same rate as during cycle 3 until 2.6 V was reached. This indicates that the capacitance was the same as the capacitance during cycle 3 until the terminal voltage reached 2.6 V. However, after the terminal voltage exceeded about 2.6 V, the increasing rate of the terminal voltage decreased. This demonstrates that the capacitance began to increase from this point.

During this cycle 10, the charging voltage was raised and the capacitance increased. The increase in the capacitance was maintained after full discharging. That is, during cycle 12, the increasing rate of the terminal voltage was lower than during cycle 3 from the beginning of charging. The capacitance was increased compared with the capacitance during cycle 3. The capacitance increased in this way was maintained after the charging voltage was lowered to 3.5 V as during cycle 16.

The expansion pressure on the plates increased and decreased roughly in proportion to the increase in the capacitance in synchronism with the charge/discharge cycling. The amplitude, or the difference between the maximum pressure and minimum pressure, assumed a value of 2 to 20 $kg/cm^2$, though it is affected by the concentrations, kinds, charge states and other factors of the carbonaceous material and the electrolyte.

As described above, the EDLC using a carbon material in accordance with the present invention has crystallites of graphite-like carbon. These crystallites have interlayer distances of 0.365 to 0.385 nm. This EDLC is fabricated in the same manner as the prior art EDLC. During initial charging, a voltage higher than the rated voltage of the EDLC is applied. In consequence, the EDLC exhibits a higher capacitance.

Preferably, the EDLC in accordance with the present invention is designed to resist the expansion pressure exerted on the plates in order to suppress increases in the volume of the capacitor during charging. Although increases in the volume are suppressed in this way, the merit produced by the increase of the capacitance is not impaired.

Figure 5:
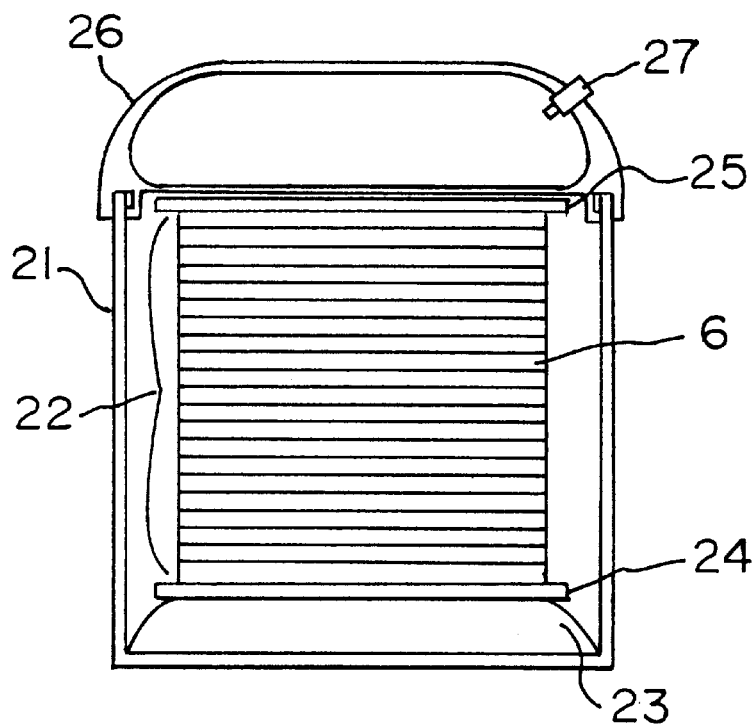
FIG. 5 is a cross-sectional view of an EDLC in accordance with the present invention.

FIG. 5 is a cross-sectional view of another EDLC in accordance with the present invention. This capacitor has a hermetic container 21 in which EDLC cells 6 are mounted. In the container 21, the aforementioned aluminum collector, carbon electrode, separator, carbon electrode and second aluminum collector are stacked in this order. The lamination 22 is impregnated with an electrolyte. The numerous cells 6 are hermetically sealed with synthetic resin film and stacked on top of each other to form the lamination 22. The cells are electrically wired in series or parallel.

Preferably, each cell is fabricated by preparing a bag consisting either of at least one layer of synthetic resin film or of a lamination of a synthetic film and a metal film, receiving capacitor elements, such as polarized plates, collectors and an electrolyte in the bag, evacuating the inside of the bag, hermetically sealing the bag and bringing the bag into intimate contact with the capacitor elements.

Alternatively, each cell may be fabricated as follows. A bag is fabricated from at least one layer of synthetic resin film or a lamination of a synthetic film and a metal film. The bag has a capacitor element-receiving chamber and a trap in communication with the chamber. Capacitor elements including polarized plates, collectors, a separator and an electrolyte are received in the manner described below.

(1) The capacitor elements are put into the bag. The inside of the bag is evacuated and deaerated. Then the opening of the bag is sealed. The capacitor elements are electrically energized to perform charging and discharging. (2) The trap is cooled inside a subatmospheric-pressure chamber whose interior is lower in pressure than the interior of the trap. Substances evaporating from the capacitor elements are collected in the trap. (3) The intervening portion between the trap and the capacitor element-receiving chamber is melted and sealed. (4) The trap is separated, thus obtaining an EDLC cell.

In the above step (2), substances evaporating from the capacitor elements can be exhausted by inserting an appropriate suction nozzle into the trap.

In this way, those substances which are emitted from the components of the EDLC during initial charging and discharging and undesirable for the characteristics of the capacitor can be collected in the trap and removed. As a result, EDLC cells having excellent characteristics can be obtained.

A concave bottom plate 23 is mounted at the bottom of the capacitor container 21 to resist the pressure difference between the inside and the outside. A bottom holder plate 24 is mounted on the concave bottom plate 23 to maintain the numerous received cells in compression against the expansion pressures acting on their respective cells. A top holder plate 25 is mounted on top of the EDLC. Preferably, the bottom holder plate 24 and the top holder plate 25 are each made of a metal plate having high rigidity.

A pressure application means 26 acting to limit increases in the dimensions of the EDLC against the expansion pressures is mounted on the top holder plate 25. The pressure application means 26 can be fabricated in various forms. For example, the pressure application means shown in FIG. 5 consists of a resilient body, such as rubber, sealed with a high-pressure fluid. This resilient body has an injection port 27 to permit introduction of the high-pressure fluid. This fluid produces pressure to limit increases in the dimensions of the EDLC against the expansion pressures from the capacitor cells. In the EDLC in accordance with the present embodiment, this pressure acting to limit increases in the dimensions of the EDLC against the expansion pressures can be easily adjusted by adjusting the pressure of the fluid admitted into the pressure application means.

In the EDLC in accordance with the present invention the expansion pressures are produced principally in the direction of application of a voltage. Therefore, if the dimension-limiting structure acts only in the direction of application of the voltage and any other dimension-limiting structure acting in another direction is not provided, no practical problems will take place.

The EDLC shown in FIG. 5 is kept hermetic by the synthetic resin film and received in the hermetic container. Therefore, the possibility that the capacitor is adversely affected by external environments is low.

The EDLC in accordance with the present invention is under pressure at all times by the top and bottom holder plates. This can maintain well the electrical connection between the collectors and the positive and negative plates.

EDLCs are preferably put into the capacitor container after separating substances evaporating from the EDLCs during initial charging by the following method, for example. Pressure is applied to the EDLCs outside the container. Under this condition, the EDLCs are charged with a voltage higher than the rated voltage by 10 to 20%. Air bubbles and other substances emanating from the EDLCs are collected in a preliminary chamber formed in a hermetic bag made of synthetic resin film. Then the preliminary chamber is separated.

Figure 6:
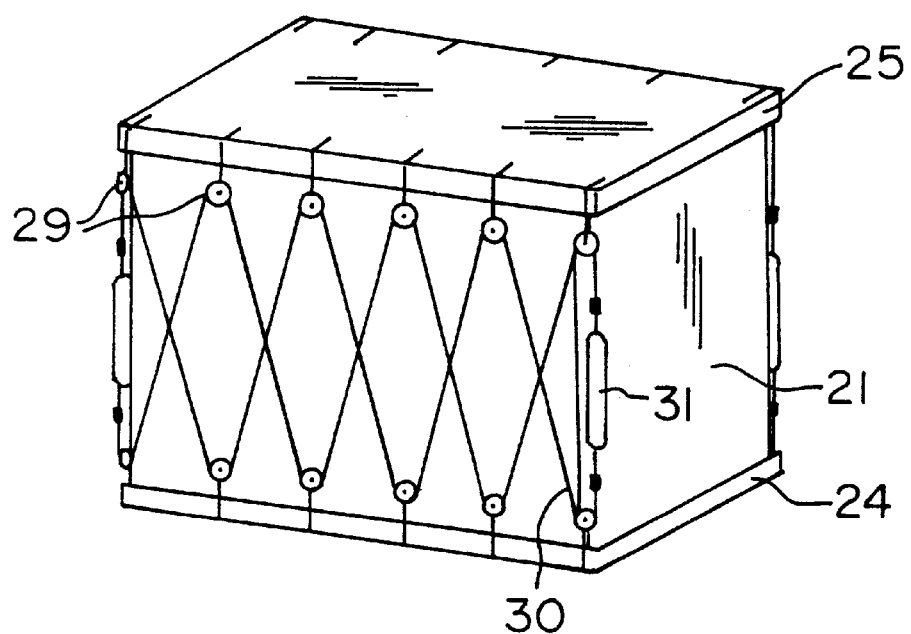
FIG. 6 is a perspective view of another EDLC in accordance with the present invention.

FIG. 6 is a perspective view of laminated EDLCs in accordance with the present invention. An EDLC lamination 22 is held between a bottom holder plate 24 and a top holder plate 25. Wires 30 are trained between the bottom holder plate 24 and the top holder plate 25 via pulleys 29. A tensioning member 31 applies given tension to the wires. As a result, given pushing force is applied to the lamination 22 of the EDLC.

Preferably, the top and bottom holder plates are made of a metal material having high rigidity, such as an aluminum alloy. The wires are preferably made of stainless steel.

For example, where the area of the EDLC is 44 cm$^2$ and a pressure of 2 kg/cm$^2$ must be applied, it is necessary to apply load of 88 kg to each holder plate. The tension in the wires can be reduced by increasing the number of the pulleys. Specific examples of the invention are given below.

EXAMPLE 1

Petroleum coke was heat-treated at 750° C. for 2 hours in an inert ambient. Two parts by weight of potassium hydroxide were mixed into 1 part of the heat-treated coke and the mixture was heat-treated at 800° C. in an inert ambient. Thus, a carbonaceous material was obtained. Carbonization was previously conducted by heat-treatment in an inert ambient. This carbonization hindered the progress of the activation. Consequently, the BET specific surface area of the obtained carbonaceous material was restricted to about 300 m$^2$/g. This makes it possible to use the activated carbon in the EDLC having a large capacitance density. Curve C in FIG. 1 indicates the results of X-ray diffraction of this carbonaceous material.

The carbonaceous material obtained in this way was pulverized into a grain size of about 30 μm. Then, 82 mg of the carbonaceous material, 9 mg of carbon black serving as a conductive additive and 9 mg of polytetrafluoroethylene powder acting as a binder were mixed and kneaded together. The mixture was rolled into a sheet having a thickness of 0.5 mm. Cylindrical electrodes having a diameter of 20 mm were cut from this sheet and placed within a vacuum desiccator whose interior was evacuated to 10 Torr. The electrodes were dried at 120° C. for 4 hours.

Then, two of the electrodes were taken out and placed on top of each other via a glass separator within a glove box whose inside was maintained at a low humidity. The separator assumed a thickness of about 100 μm when compressed. Two collectors of aluminum were placed on the outermost surfaces of the aforementioned electrodes, thus forming an EDLC body.

The EDLC body was put into an aluminum hermetic container sealed with an O-ring. One mole of tetraethylammonium tetrafluoroborate was dissolved in propylene to prepare an electrolyte. The capacitor body was sufficiently impregnated with this electrolyte. In this way, a testing EDLC was obtained.

The obtained EDLC was charged and discharged up to 4 V during only one cycle. The charging and discharging current was 5 mA. Then, the EDLC was charged and discharged with 2.3 V and the resulting characteristics were measured using the instrument shown in FIG. 2. The results of the measurements are given in Table 1.

COMPARATIVE EXAMPLE 1

Petroleum coke was used in the same way as in Example 1. However, no heat-treatment was performed, unlike Example 1. Then, 1.7 parts by weight of potassium hydroxide were mixed into 1 part of the coke. The mixture was heated at 400° C. for 1 hour in a nitrogen ambient. The mixture was then activated at 800° C. for 2 hours, thus obtaining a carbonaceous material or activated carbon. The specific surface area of the activated carbon was 2500 m$^2$/g, which is enough to fabricate an EDLC having a large capacitance density. Using the activated carbon obtained in this way, an EDLC was manufactured in the same way as in Example 1. The characteristics of the manufactured EDLC ere measured in the same way as in Example 1. The results re shown in Table 1. The results of X-ray diffraction measurements of the activated carbon used in Comparative Example 1 are indicated by curve B in FIG. 1.

EXAMPLE 2

Coconut husks were carbonized to produce coconut char. This char was activated with steam at 1000° C., giving rise to a carbonaceous material. The amount of the steam was set small to limit the progress of the activation. The performance of the activated carbon was not sufficient for an EDLC having a specific surface area of 400 m$^2$/g. Using this carbonaceous material, an EDLC was fabricated in the same way as in Example 1. The characteristics of the obtained EDLC were measured. The results are given in Table 1. The results of X-ray diffraction measurements of the activated carbon produced in Example 2 were indicated by curve D in FIG. 1.

COMPARATIVE EXAMPLE 2

Coconut husks were carbonized to produce coconut char. This carbon was activated with steam at 1000° C., giving rise to a carbonaceous material having a specific surface area of about 1600 m$^2$, which was sufficient to fabricate the EDLC having a large capacitance density. Using this activated carbon, an EDLC was fabricated in the same way as in Example 1. The results are given in Table 1. The results of X-ray diffraction measurements of the activated carbon prepared in Comparative Example 2 were denoted by curve E in FIG. 1.

TABLE 1

|  | capacitance density (Fml) | expansion pressure (kg/cm$^2$) | specific surface area (m$^2$/g) |
| --- | --- | --- | --- |
| Example 1 | 28.5 | 7.5 | 300 |
| Comparative Example 1 | 20.5 | below 1.0 | 2500 |
| Example 2 | 18.8 | 3.0 | 400 |
| Comparative Example 2 | 13.4 | below 1.0 | 1600 |

It can be seen from Table 1 that EDLCs using carbonaceous materials in accordance with the preferred embodiments of the present invention have capacitance densities higher than those of EDLCs using conventional activated carbon by more than 40%. Furthermore, these novel electric-layer capacitors show expansion pressures higher than the values obtained in the comparative examples. The specific surface areas were measured before the ions of the electrolyte entered between the positive and negative plates. It is observed that even activated carbons having small specific surface areas exhibit large capacitances and that the capacitance of each EDLC does not always depend on the specific surface area of the plate material.

It is to be understood that EDLCs having larger capacitance densities than conventional can be fabricated from carbon materials in accordance with the present invention.

Having thus described my invention with the detail and particularity required by the Patent Laws, what is desired protected by Letters Patent is set forth in the following claims.

What is claimed is:

1. An electric double layer capacitor comprising:
   polarized plates made of a carbonaceous material that expands on application of a voltage with an expansion pressure in excess of 1 kg/cm$^2$; and
   a dimension-limiting structure in which said polarized plates are mounted such that expansion of the plates is limited by said dimension-limiting structure on application of the voltage.

2. The electric double layer capacitor of claim 1, wherein said dimension-limiting structure limits expansion of the plates in the direction of application of the voltage when the voltage is applied.

3. An electric double layer capacitor comprising:
   polarized plates made of a carbonated material that expands on application of a voltage; and
   a dimension-limiting structure in which said polarized plates are mounted such that expansion of the plates is limited by said dimension-limiting structure on application of the voltage wherein an expansion pressure of more than 2 kg/cm$^2$ is produced on the plates.

4. The electric double layer capacitor of claim 3, wherein said carbonaceous material is obtained by preheating petroleum coke, mixing the coke into potassium hydroxide to produce a mixture, and heat treating the mixture in an inert ambient.

5. The electric double layer capacitor of claim 3, wherein said capacitor is charged at a voltage higher than the rated voltage of the capacitor during initial charging.

6. An electric double layer capacitor comprising:
   polarized plates made of a carbonaceous material that expands on application of a voltage; and
   a dimension-limiting structure in which said polarized plates are mounted such that expansion of the plates is limited by said dimension-limiting structure on application of the voltage wherein said carbonaceous material is obtained by preheating petroleum coke, mixing the coke into potassium hydroxide to produce a mixture, and heat treating the mixture in an inert ambient.

7. The electric double layer capacitor of claim 6, wherein said dimension-limiting structure limits expansion of the plates in the direction of application of the voltage when the voltage is applied.

8. An electric double layer capacitor comprising:
   polarized plates made of a carbonaceous material that expands on application of a voltage; and
   a dimension-limiting structure in which said polarized plates are mounted such that expansion of the plates is limited by said dimension-limiting structure on application of the voltage wherein said capacitor is charged at a voltage higher than the rated voltage of the capacitor during initial charging.

9. The electric double layer capacitor of claim 8, wherein said dimension-limiting structure limits expansion of the plates in the direction of application of the voltage when the voltage is applied.

10. The electric double layer capacitor of any one of claims 1, 6, or 8, wherein said carbonaceous material is obtained by heat-treating coconut char in an inert ambient or in an ambient-containing steam.

* * * * *

UNITED STATES PATENT AND TRADEMARK OFFICE
CERTIFICATE OF CORRECTION

PATENT NO.   : 6,310,762 B1                                                   Page 1 of 1
DATED        : October 30, 2001
INVENTOR(S)  : Michio Okamura et al.

It is certified that error appears in the above-identified patent and that said Letters Patent is hereby corrected as shown below:

<u>Title page,</u>
Item [56], References Cited, insert:

-- U.S. PATENT DOCUMENTS
| | | | | |
|---|---|---|---|---|
| 3,652,902 | * | 3/1972 | Hart et al. …………….. | 361/502 |
| 5,430,606 | * | 7/1995 | Adach et al. ………….. | 361/502 |
| 5,786,980 | * | 7/1998 | Evans ……………….. | 361/502 |
| 5,923,525 | * | 7/1999 | Belyakov et al. ……….. | 361/502 |
| 6,094,338 | * | 7/2000 | Hirahara et al. ……….. | 361/502 --. |

<u>Column 5,</u>
Line 20, "a Constant" should read -- a constant --.

<u>Column 8,</u>
Line 46, "ere measured" should read -- were measured --.
Line 47, "re shown" should read -- are shown --.

Signed and Sealed this

Tenth Day of September, 2002

*Attest:*

*Attesting Officer*

JAMES E. ROGAN
*Director of the United States Patent and Trademark Office*